Patented Jan. 8, 1952

2,582,212

UNITED STATES PATENT OFFICE 2,582,212

CONVERSION OF ACYLOXYMETHYLENE-4-PENTENOATES TO ETHER ESTERS

John O. Van Hook, Philadelphia, and Willard J. Croxall, Bryn Athyn, Pa., assignors to Rohm & Haas Company, Philadelphia, Pa., a corporation of Delaware No Drawing. Application January 21, 1949, Serial No. 72,074

11 Claims. (Cl. 260—468)

This invention deals with the conversion of 2-acyloxymethylene-4-pentenoate esters to ethers of 2-hydroxymethylene-4-pentenoates and monohydric alcohols.

In our application Serial No. 72,076, filed on even date, now Patent No. 2,540,071, it is shown that esters of the formula

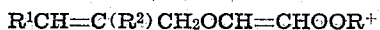

wherein $R^1$ is a phenyl group, an alkyl group of not over four carbon atoms, hydrogen, chlorine, or bromine, $R^2$ is likewise hydrogen, chlorine, bromine, an alkyl group of not over four carbon atoms, or a phenyl group, and $R^+$ is a non-tertiary hydrocarbon group, particularly an alkyl group of not over eight carbon atoms joined to oxygen at a non-tertiary carbon atom, are rearranged by heating at 150° to 250° C. to yield compounds of the formula

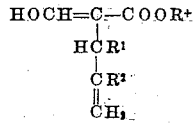

It is also shown in the above-identified application in application Serial No. 72,075, filed on even date, now Patent No. 2,540,070, that the free hydroxyl group of the rearranged compounds reacts with acid anhydrides to yield acyloxy derivatives.

We have now discovered that these derivatives react with alcohols in the presence of an acidic catalyst to yield ether esters of the formula

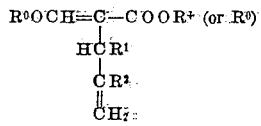

where $R^0$ is a hydrocarbon residue of a non-tertiary alcohol of not over eighteen carbon atoms, $R^0OH$. It is a preferred condition that $R^0$ contain not over nine carbon atoms. The claims of the present application are directed to the above ether ester and to the process of their preparation, particularly where $R^0$ is an alkyl or cycloalkyl group. The situation in which $R^0$ is a 2,3-unsaturated group and the resulting ether is rearranged is shown in our application Serial No. 72,073, now Patent No. 2,540,073.

The above products are new ether esters which are of considerable interest. They have unsaturated linkages which give them chemical reactivity. They are of value in the formation of polymeric products. They react with ureas and thioureas to form uracils and thiouracils. When $R^0$ has an allylic structure, the new ether esters are rearranged by heating to yield malonaldehydes. Thus, when $R^0$ has the structure

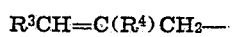

the rearranged compound is

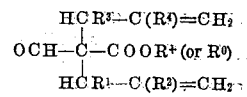

When this compound is heated with an alkali metal hydroxide or alkoxide, such as potassium hydroxide or sodium alloxide, it loses the CO group from the aldehyde group to form esters of the structure

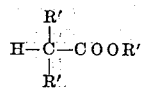

$R'$ representing 2,3-unsaturated hydrocarbon groups.

The starting materials for use in this invention may be derived from acetylene and a normal ester of carbonic acid. As is shown in application Serial No. 52,607, filed by Croxall and Schneider on October 2, 1948, now Patent No. 2,535,001, acetylene reacts with an ester of carbonic acid and a non-tertiary alcohol in the presence of an anhydrous, strongly alkaline catalyst to form beta-ether acrylates and beta,beta-diether propionates. When diallyl carbonate is used, there are obtained allyl beta-alloxyacrylate and allyl beta,beta-di(alloxy)propionate. Other carbonates may be used in place of allyl carbonate, both saturated and unsaturated. In place of the allyl group proper, there may be used other 2,3-unsaturated alcohol residues.

It is not necessary, however, to prepare at this stage an ether ester having allylic groups. The starting carbonate ester may be that of a lower saturated aliphatic alcohol, $ROH$, such as dimethyl carbonate, diethyl carbonate, dipropyl carbonate, or dibutyl carbonate. These react with acetylene between 10° C. and 110° C. in the presence of an alkaline catalyst to give corresponding beta-alkoxyacrylate and beta,beta-dialkoxypropionates. When such an ether ester is heated with a 2,3-unsaturated alcohol, $R'OH$, in the presence of an alkaline catalyst, the lower alkyl groups are displaced by the unsaturated alcohol residue, as falls within the purview of application Serial No. 52,601, filed by Croxall and Van Hook on October 2, 1948, now Patent No. 2,535,009.

Both the ether and the ester groupings need not, however, be thus replaced. The alkyl group forming the ether function may be selectively replaced with another alcohol residue. This is accomplished by heating an alkyl beta-alkoxyacrylate or alkyl beta,beta-dialkoxypropionate with an alcohol $R'OH$, which boils higher than $ROH$ and which is here unsaturated in the 2,3-position, in the presence of a mildly acidic catalyst, such as an alkali metal sulfate. There is taken from the reaction mixture the alcohol corresponding to the alkyl group, R, and, when an amount of such alcohol as is equivalent to the ether group has been removed, the reaction is interrupted. In this way ether esters of the formulae

R'OCH=CHCOOR and (R'O)$_2$CHCH$_2$COOR are obtained as is more fully described in application Serial No. 52,602, filed by Croxall and Van Hook on October 2, 1948, now Patent No. 2,535,010.

The beta,beta-diether propionates are converted to beta-monoether acrylates when the former are heated in the presence of a dealcoholating catalyst, such as an alkali metal acid sulfate or an alkali, and a mole of alcohol taken off per mole of ester. This process is described in detail in application Serial No. 52,608, filed by Croxall and Schneider on October 2, 1948, now Patent No. 2,571,212. By this process an ether ester such as ethyl beta,beta-diethoxypropionate is converted to ethyl beta-ethoxyacrylate or allyl beta,beta-dialloxypropionate is converted to allyl beta-alloxyacrylate.

In place of the allyl group used above, there may be utilized other allylicly unsaturated groups, particularly a hydrocarbon group or a halohydrocarbon group. The preferred unsaturated groups are allyl, 2-methallyl, 2-ethallyl, 2-propallyl, 2-butallyl, 2-phenallyl, 2-chlorallyl, 2-bromallyl, 3-chlorallyl, 3-bromallyl, 3-methallyl (crotyl), 3-ethallyl, 3-propallyl, 3-butallyl, and 3-phenallyl (cinnamyl). These are residues of alcohols of the formula

R$^1$CH=C(R$^2$)CH$_2$OH

The most convenient and economical method for introducing one of these groups is through transetherification of an alkyl beta-alkoxyacrylate or beta,beta-dialkoxypropionate by methods shown above. A mixture of alkyl beta-alkoxyacrylate and alkyl beta,beta-dialkoxypropionate may be used quite as well as the individual ether esters. There are thus obtained compounds of the formula

R$^1$CH=C(R$^2$)CH$_2$OCH=CHCOOR where R under these conditions is an alkyl group of not over eight carbon atoms, particularly an alkyl group of one to four carbon atoms, and R$^1$ and R$^2$ have the significance described above. It is necessary that during transetherification the reaction temperature be maintained below 150° C. if the above compounds are to be isolated. For this purpose the alcohol ROH, which is displaced, is advantageously taken off under reduced pressure. If isolation of a transetherified ether ester is not required, the reaction may be carried over this stage and only the rearranged products isolated.

One may thus start with an ester, (R+O)$_2$CO, of carbonic acid and of a saturated monohydric alcohol, R+OH, where R+ is a non-tertiary hydrocarbon group, particularly an alkyl group of not over eight carbon atoms and preferably not over four carbon atoms. By reaction thereof with acetylene at 20° C. to 110° C. in the presence of a strongly alkaline catalyst such as an alkali metal acetylide, an alkali metal alcoholate, or a strongly basic quaternary ammonium alkoxide, there are obtained such acrylates as methyl beta-methoxyacrylate, ethyl beta-ethoxyacrylate, propyl beta-propoxyacrylate, butyl beta-butoxyacrylate, hexyl beta-hexoxyacrylate, or octyl beta-octoxyacrylate, or such propionates as methyl beta,beta-dimethoxypropionate, ethyl beta,beta-diethoxypropionate, butyl beta,beta-dibutoxypropionate, or octyl beta,beta-dioctoxypropionate, or mixtures of ether acrylate and diether propionate. Esters such as allyl beta-alloxyacrylate or beta,beta-dialloxypropionate may likewise be made. Along with these there may be obtained ether maleates and diether succinates.

When acetylene is no longer absorbed by the reaction mixture, the catalyst is destroyed and the reaction mixture separated by distillation. A fraction containing ether acrylate and diether propionate may be taken off. This may be heated, desirably under reduced pressure, with an alkali metal acid sulfate and the propionate decomposed to acrylate, although this is not essential.

The alkoxy acrylates may then be transetherified by heating them with a 2,3-unsaturated alcohol, R'OH, such as allyl chloroallyl, 3-chloroallyl, 2-bromoallyl, 2-methallyl, 2-ethallyl, 2-butallyl, crotyl, or cinnamyl alcohol or 2-pentenol, 2-hexenol, or 2-heptenol. A mildly acidic catalyst is used at concentrations of 0.01% to 1% of the weight of the ether ester. The alcohol ROH is displaced at temperatures between 75° C. to 150° C. at normal or reduced pressures. This permits isolation of the compound

R'OCH=CHCOOR where R' is the unsaturated group introduced.

This product is then heated at 150° C. to 250° C., preferably 150° C. to 200° C., and is thereby rearranged. The resulting ester of 2-hydroxymethylene-4-pentenoic acid may then be separated, if desired.

Alternatively, the same ester may be obtained by heating an alkyl beta-alkoxyacrylate or beta,beta-dialkoxypropionate at 150° C. to 250° C. in the presence of an alkali metal acid sulfate with a beta,gamma-unsaturated alcohol, R'OH. Transetherification and rearrangement both occur. The alcohol displaced is distilled off, the catalyst is destroyed, and the rearranged product is isolated.

Similarly, an alkyl beta-alkoxyacrylate is heated at 150° C. to 250° C. in the presence of an alkaline catalyst with an alcohol having a hydrocarbon residue olefinically unsaturated in the beta,gamma-position. Transetherification and transesterification now both take place accompanied by rearrangement of one unsaturated group introduced from the beta,gamma-unsaturated alcohol. Under these conditions there can be separated transetherified and transesterified acrylates and also esters of 2-hydroxymethylene-4-pentenoic acid. If heating is prolonged or continued at elevated temperatures, there may even occur decarbonylation of the last-named esters to 4-pentenoates.

There follows a description of the preparation of specific intermediate compounds in order to illustrate the procedures which have been generally set forth above.

A. In a reaction vessel equipped with a packed distilling column there were mixed 500 grams of ethyl beta-ethoxyacrylate, which had been prepared according to the procedures detailed in applications Serial Nos. 52,607 and 52,608, filed on October 2, 1948, 600 grams of allyl alcohol, and 0.25 gram of sodium hydrogen sulfate. The mixture was heated and at pot temperatures of 100° C. to 120° C. ethyl alcohol was taken off followed by a mixture of ethyl alcohol and allyl alcohol. The liquid remaining was distilled under reduced pressure. At 25°–46° C./22 mm. allyl alcohol was taken off and at 51°–68° C./3 mm. a small fraction of a mixture of allyl alcohol and ethyl beta-alloxyacrylate. There were then distilled 390 grams of ethyl beta-alloxyacrylate at 65°–72° C./2–3 mm. This product was redistilled at 73° C./3 mm.

B. A portion of 312 grams of ethyl beta-alloxyacrylate, to which was added 5 grams of beta-naphthol as a polymerization inhibitor, was stirred and heated at 150° C. (±5° C.) for two hours. It was then cooled to 10° C. and mixed with a solution of 80 grams of sodium hydroxide in 500 ml. of water, also at 10° C. This mixture was allowed to form layers, which were separated. The aqueous layer was extracted with ethyl ether. The ether extract was combined with the organic layer, the ether evaporated, and unreacted ethyl beta-alloxyacrylate recovered by distillation. The aqueous layer was rendered acidic by addition of hydrochloric acid. An organic layer thereupon was formed. It was separated from the aqueous layer by extraction with ethyl ether. The ether-organic layer was dried over a calcium sulfate drying agent and distilled. After the ether had been stripped off, there was obtained a fraction of 95 grams distilling at 63°–76° C./2.5 mm. and corresponding in composition to ethyl 2-hydroxymethylene-4-pentenoate. This substance was redistilled at 45°–47° C./1 mm.

In the above-described preparation but one allyl group was introduced in the ether acrylate by transetherification. Both transetherification and transesterification may, however, be effected to introduce two allylic groups, as will now be shown.

C. There were mixed in a reaction vessel equipped with a packed distilling column 145 grams of ethyl beta-ethoxyacrylate, 175 grams of methallyl alcohol in which five grams of sodium had been dissolved, and 200 grams of toluene. The mixture was heated and an azeotrope of ethanol and toluene taken off at 76° to 85° C. while the pot temperature gradually rose to 125° C. The charge was cooled, poured into water, and acidified. An oil layer formed which was separated, washed with brine, dried, and distilled. After toluene had been removed, most of the remaining liquid was distilled between 40° and 140° C./1 mm. It was washed with 200 ml. of a cold aqueous solution containing 10% of sodium hydroxide. The organic layer was separated, dried over anhydrous potassium carbonate, and distilled. There was obtained 12 grams of methallyl 4-methyl-4-pentenoate at 32°–40° C./1 mm., 42 grams of methallyl beta-methalloxyacrylate at 40° to 85° C./1 mm., and 27 grams of methallyl beta,beta-di(methalloxy)propionate at 85° to 90° C./1 mm.

D. The methallyl beta-methalloxyacrylate was redistilled at 91°–92° C./3 mm. This was heated to 170°–175° C. to cause rearrangement. It was then shaken with 200 ml. of a 10% aqueous sodium hydroxide solution. The solution was separated and extracted with ether. This solution and the sodium hydroxide solution obtained above were acidified by the addition of hydrochloric acid. The acidic solution was extracted with ether and the ether layer separated, dried, and distilled. After removal of ether there was obtained at 64° to 66° C./1 mm. a liquid which was methallyl 2-hydroxymethylene-4-methyl-4-pentenoate.

By these methods there are obtained esters of 2-hydroxymethylene-4-pentenoic acid and of saturated aliphatic monohydric alcohols, ROH, or of 2,3-unsaturated alcohols, R′OH,

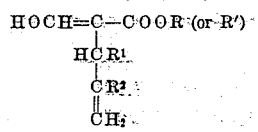

These react with carboxylic acid anhydrides, such as acetic anhydride, propionic anhydride, butyric anhydride, or the like to form the acyloxy derivatives,

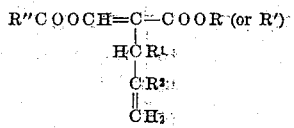

where R″ is preferably an alkyl group of not over three carbon atoms.

For this reaction the ester of 2-hydroxymethylene-4-pentenoic acid and acid anhydride are mixed. After the initial reaction has subsided, there may be distilled from the reaction mixture the carboxylic acid formed as a by-product. The acylated ester remains and may be used in this form or may be purified, as by distillation. The following are specific examples illustrating this procedure.

E. A mixture of 157 grams of ethyl 2-hydroxymethylene-4-pentenoate and 220 grams of acetic anhydride was heated in a reaction vessel equipped with a distilling column. Acetic acid was taken off at 110° to 125° C. whereupon a mixture of acetic acid and acetic anhydride was obtained. The reaction mixture was then distilled under reduced pressure. After the excess acetic anhydride had been taken off, there was obtained at 75° C./1 mm. 115 grams of ethyl 2-acetoxymethylene-4-pentenoate, having a refractive index of 1.4601.

F. (a) The procedure of Example E was applied to a mixture of ethyl 2-hydroxymethylene-4-pentenoate and propionic anhydride. There was obtained at 90°–95° C./0.5 mm. ethyl 2-propionyloxymethylene-4-pentenoate. (b) Substitution of butyric anhydride for acetic or propionic anhydride led to ethyl 2-butyroxymethylene-4-pentenoate.

An alternative approach to the acylated ester is by heating an alloxycrylate with a carboxylic acid anhydride. Theoretically, the 2-hydroxymethylene-4-pentenoate is formed and acylated. In any case the product separated is a beta-acyloxymethylene-4-pentenoate.

G. As illustrative of this last method, the following account of a typical preparation is given. A mixture of 197 grams of ethyl beta-alloxyacrylate and 255 grams of acetic anhydride of 90% purity was heated to 150° C. in a flask equipped with a four-foot packed column. There was taken off a small amount of material at overhead temperatures of 60° to 115° C. There was then obtained at 118°–125° C. 76 grams of acetic acid while the pot temperature advanced to 170° C. The pressure within the apparatus was then reduced and excess acetic anhydride taken off. The remaining material was subjected to fractional distillation at reduced pressure. After a small forerun a fraction amounting to 170 grams was obtained at 102°–108° C./2–3 mm. It had a refractive index, $n_D^{20}$, of 1.4600, a molecular refraction, $MR_D$, of 51.41, and a density, $$d_{20}^{20}$$

of 1.056. It had a saponification number of 563 and an acid number of 284. It contained 59.86% of carbon and 7.33% of hydrogen. These values agree well with those calculated for ethyl 2-acetoxymethylene-4-pentenoate, for which theoretical values are saponification number—568, acid number—284, $MR_D$—50.76, carbon content—60.59%, and hydrogen content—7.12%.

In place of acetic anhydride in the above specific examples, there may be used other carboxylic acid anhydrides to give the corresponding 2-acyloxymethylene-4-pentenoates such as ethyl 2-propionoxymethylene-4-pentenoate and ethyl 2-butyroxymethylene-4-pentenoate. In place of the ethyl ester, there may be used other esters, such as methyl, propyl, butyl, hexyl, or octyl, or an alkenyl group, such as allyl, methallyl, crotyl, cinnamyl, chlorallyl, bromallyl, or the like.

H. A mixture of 156 grams (1.0 mole) of ethyl beta-alloxyacrylate and 195 grams (1.5 moles) of propionic anhydride was heated in a Claisen flask at 172°–175° C. while 79 grams (1.07 moles) of propionic acid was distilled off at 133°–140° C. This had a refractive index, $n_D^{20}$, of 1.3920. The residue was cooled and the distillation was continued in vacuo. After excess propionic anhydride was distilled off at 35°–89° C./0.5 mm. in an amount of 92 grams, there was obtained 140 grams (66% yield) of ethyl 2-propionoxymethylene-4-pentenoate which distilled at 89°–97° C./0.5 mm. On redistillation, it boiled at 92°–94° C./0.5 mm. and had an index of refraction, $n_D^{20}$, of 1.4597 and a density, $$d_{20}^{20}$$

of 1.029.

I. A mixture of 156 grams (1.0 mole) of ethyl beta-alloxyacrylate and 237 grams (1.5 moles) of butyric anhydride was heated in a Claisen flask at 179°–202° C. while 94 grams (1.07 moles) of butyric acid which distilled at 135°–154° C. was collected. The residue was cooled and the distillation was continued in vacuo. After removal of 128 grams of butyric anhydride, which distilled at 46°–95° C./0.5 mm., there was obtained 125 grams (52% yield) of ethyl 2-butyroxymethylene-4-pentenoate which distilled at 95°–102° C./0.4 mm. and had an index of refraction, $n_D^{20}$, of 1.4571.

Since the acyloxy group is to be displaced according to this invention, there is ordinarily no advantage in the use of other than the smallest and most economical group, the acetoxy group, in forming the 2-acyloxymethylene substituent. This invention is directed to the replacement of the acyloxy group, specifically the acetoxy group, and conversion thereof to an alkoxy group. This is accomplished by heating an ester of the formula

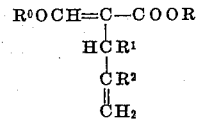

with an alcohol, $R^0OH$, in the presence of an acidic catalyst. Temperatures of 50° to 150° C. or more may be used. Suitable catalysts are phosphoric acid, sulfuric acid, p-toluene sulfonic acid, or other acid which is effective in esterification reactions. The acyl group is removed through formation of an ester with the alcohol, or with the alcohol group from the original 2-acyloxymethylene-4-pentenoate ester, or both. The ester, R″COOR or R″COOR⁰, is removed by volatilization, under reduced pressure if advantageous. The ester-forming group, R, may also be replaced with $R^0$ and the alcohol ROH taken off. The product obtained is of the formula

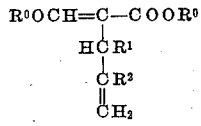

or

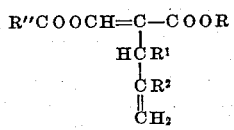

The alcohol, $R^0OH$, which is used for this operation may be any non-tertiary monohydric alcohol. Particularly suitable are those primary and secondary alcohols in which the residue $R^0$ is a hydrocarbon group, acyclic or alicyclic, including alkyl or cycloalkyl groups, such as butyl, isobutyl, sec.-butyl, hexyl, 2-ethylbutyl, isoheptyl, octyl, capryl, decyl, dodecyl, cetyl, stearyl, cyclohexyl, methylcyclohexyl, or the like, and groups such as benzyl, methylbenzyl, hexahydrobenzyl, hydroterpenyl, etc. Unsaturated hydrocarbon groups, such as allyl, crotyl, cinnamyl, methallyl, ethallyl, propallyl, hexenyl, undecyl, oleyl, tetrahydrobenzyl, terpenyl, endomethylenetetrahydrobenzyl, etc., are also of considerable interest, as they give particularly useful and reactive derivatives. When $R^0$ is a 2,3-unsaturated alcohol residue; i. e., an allylic alcohol (R′OH), ethers of hydroxymethylene-4-pentenoates are obtained which undergo an allylic rearrangement, when heated, to form new unsaturated aldehydo-carboxylates or malonaldehydates. These lose their aldehyde group when heated with an alkali hydroxide or an alkali metal alcoholate. Thus, when $R^0$ has the structure $HCR^3=C(R^4)CH_2$—, the following reactions can occur

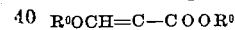
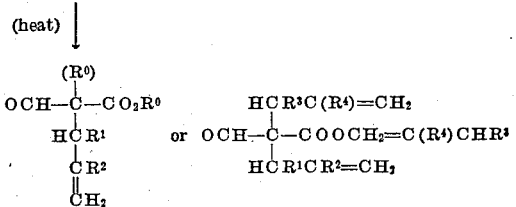
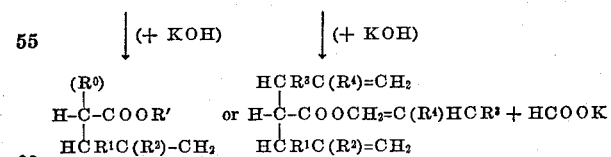

The following examples are illustrative of the process of this invention which is here claimed.

*Example 1*

A mixture of 60 grams of ethyl 2-acetoxymethylene-4-pentenoate, 100 ml. of methanol, and one gram of p-toluene sulfonic acid was heated in a reaction vessel carrying a distilling column. Methyl acetate was distilled therefrom at temperatures of 56°–64° C. Excess methanol was taken off and the reaction mixture subjected to distillation under reduced pressure. There was obtained at 55°–67° C./1 mm. ethyl 2-methoxymethylene-4-pentenoate in an amount of 27 grams. The refractive index, $n_D^{20}$, was 1.4633.

Example 2

A mixture of 104 grams of ethyl 2-acetoxymethylene-4-pentenoate, 150 grams of ethanol (anhydrous), and one gram of p-toluene sulfonic acid was heated in a reaction vessel equipped with a four-foot distilling column. There was taken off at 70°–80° C. a mixture of ethanol and ethyl acetate. The remaining liquid was fractionated through a packed column under reduced pressure. There was obtained 71 grams of ethyl 2-ethoxymethylene-4-pentenoate, distilling at 65°–70° C./0.4 mm., having a refractive index, $n_D^{20}$, of 1.4644, and containing by analysis 65.46% of carbon and 8.72% of hydrogen. Theoretical values for $C_{10}H_{16}O_3$ are 65.20% and 8.76% respectively.

Example 3

A mixture of 198 grams of ethyl 2-acetoxymethylene-4-pentenoate, 391 grams of 2-ethylhexanol, and a half gram of sulfuric acid was heated in a reaction vessel equipped with distilling column. At 63°–70° C. (overhead) there was taken off ethyl acetate. When the pot temperature reached 190° C., distillation under reduced pressure was resorted to. At 48°–80° C./0.2 mm. 169 grams of a mixture of 2-ethylhexyl acetate and 2-ethylhexanol was distilled out. There was then obtained at 80°–128° C./0.2 mm. 18 grams of a mixture of 2-ethylhexyl acetate and 2' - ethylhexyl 2 - (2''-ethylhexoxymethylene)-4-pentanoate. This mixture had a refractive index of 1.4540. At 128°–190° C./0.2 mm. there was obtained practically pure 2'-ethylhexyl 2-(2''-ethylhexoxymethylene)-4-pentenoate, amounting to 147 grams, having a refractive index of 1.4660. This product was redistilled at 158°–176° C./0.5 mm. It then had a refractive index, $n_D^{20}$, of 1.4658 and had a saponification equivalent of 360. The theoretical number is 352.

Example 4

A mixture of 100 grams of ethyl 2-acetoxymethylene-4-pentenoate, 200 grams of cyclohexanol, and two grams of phosphoric acid was heated in a reaction vessel carrying a short distilling column. At 58°–79° C. there was obtained in an amount of 45 grams ethyl acetate. When the pot temperature reached 164° C., distillation under reduced pressure was used. At 45°–57° C./1 mm. 105 grams of cyclohexanol was taken off. At 118° to 152° C./1–2 mm. 71 grams of cyclohexyl 2-cyclohexoxymethylene-4-pentenoate was obtained with slight decomposition occurring in the pot as shown by evolution of gas. The product was redistilled at 140°–144° C./0.2 mm. It then had a refractive index of 1.5025 and a saponification equivalent of 300 (theory is 292).

In place of the ethyl ester of 2-acyloxymethylene-4-pentenoic acid used above, there may be used in place of the ethyl group the methyl, propyl, butyl, amyl, hexyl, heptyl, or octyl group with similar results. It will be noted that the alcohol residue of the starting ester may be replaced during the reaction. When the ester-forming group is thus replaced with the residue R', it is, of course, desirable that the original ester have only a small alcohol residue as the ester-forming group, such as methyl or ethyl. Hence, methyl or ethyl 2-acetoxymethylene-4-pentenoates are preferred as starting materials. The pentenoate chain may have methyl, ethyl, propyl, butyl, or phenyl groups or chlorine or bromine as $R^1$ or $R^2$. These substituents are not disturbed in the above-described reactions.

The reaction of a 2,3-unsaturated alcohol of the formula

$R^3CH=C(R^4)CH_2OH$ with an ester of a 2-acyloxymethylene-4-pentenoate is a special case, for, as has been already indicated, not only is the acyl group displaced, but a rearrangement of the alloxymethylene group can occur and occurs increasingly as the temperature is raised. Thus, while the primary reaction below 150° C. is replacement of the acyl group, above 150° C. replacement is accompanied by rearrangement. When the rearranged product is that desired, the acyloxymethylene-4-pentenoate may be heated with an allylic alcohol at 150° C. to 250° C. in the presence of catalyst and the rearranged product separated.

Example 5

A mixture of 100 grams of ethyl 2-acetoxymethylene-4-pentenoate, 87 grams of allyl alcohol, one gram of p-toluene sulfonic acid, and two grams of beta-naphthol was heated in a reaction vessel equipped with a distilling column. A distillate was taken off at 80°–82° C. which contained some water. At 82°–97° C. a mixture of allyl acetate and allyl alcohol was obtained. Excess allyl alcohol was stripped off under reduced pressure. The remaining liquid was fractionally distilled. Between 78° and 99° C./1 mm. there was obtained a distillate which was chiefly allyl 2-alloxymethylene-4-pentenoate. Between 100° C. and 135° C./1 mm. the distillate was a mixture of allyl diallylmalonaldehydate and allyl 2-alloxymethylene-4-pentenoate. This was heated to 220° C. and subjected to fractional distillation. There was obtained at 67°–68° C./1 mm. or 73°–75° C./2 mm. a liquid, for which $n_D^{20}$ was 1.4532, $d_{20}^{20}$ was 0.997, and the saponification equivalent was 104. This corresponded in composition to allyl diallylmalonaldehydate,

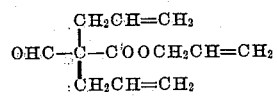

$$\begin{array}{c} CH_2CH=CH_2 \\ | \\ OHC-C-COOCH_2CH=CH_2 \\ | \\ CH_2CH=CH_2 \end{array}$$

which requires two moles of alkali for complete reaction, since the ester is saponified and the aldehyde group is cleaved to yield formate. In place of the allyl alcohol shown above, there may be used chlorallyl, bromoallyl, crotyl, 3-ethallyl, 3-butallyl, or cinnamyl alcohols. In every case the acyl group is displaced and a new ether formed, which undergoes rearrangement. When the allylic group is hydrocarbon, the malonaldehydate yields, when heated with alkali, such as potassium hydroxide or a sodium alcoholate, allyl diallylacetate and potassium or sodium formate.

Example 6

A mixture of 106 grams (0.5 mole) of ethyl 2-propionoxymethylene-4-pentenoate, 108 grams (1.5 moles) of crotyl alcohol, and 1 gram of p-toluene sulfonic acid was heated under a two-foot column. There was obtained on distillation a mixture of 9 grams of water and 50 grams of ethyl propionate, which distilled at 75°–100° C. while the pot temperature rose from 100° C. to 125° C. The remaining crotyl alcohol was stripped under reduced pressure. The residue was heated at 220° C. for 15 minutes, cooled, and then distilled from a Claisen flask in vacuo. There was obtained 60 grams of crotyl allyl-(1-methallyl) malonaldehydate which boiled at 80°–

90° C./2mm. The residue which consisted of a heavy tar weighed 51 grams. On redistillation the product boiled at 82°–85° C./2 mm., had an index of refraction, $n_D^{20}$, of 1.4492, and gave upon analysis a saponification equivalent of 115. Crotyl allyl-(1-methallyl) malonaldehydate ($C_{14}H_{20}O_3$)

calculated as a dibasic acid ester has a saponification equivalent of 118. The 60 grams of product represents a yield of 51%.

Example 7

A solution of 20 ml. of anhydrous ethanol containing one gram of dissolved sodium and 23.6 grams (0.10 mole) of crotyl allyl-(1-methallyl) malonaldehydate was heated under a one-foot column. There was obtained on fractional distillation 7.5 grams of ethyl formate which boiled at 52°–58° C. and had a refractive index, $n_D^{20}$, of 1.3600. The excess ethanol was stripped under low pressure and the residue was distilled from a Claisen flask in vacuo. There was obtained 15 grams (72% yield) of crotyl 2-allyl-3-methyl-4-pentenoate which distilled at 64°–68° C./2 mm., had a refractive index, $n_D^{20}$, of 1.4408, and had, by analysis, a saponification equivalent of 200. For crotyl 2-allyl-3-methyl-4-pentenoate ($C_{13}H_{20}O_2$)

the theoretical saponification equivalent is 208.

We claim:

1. A process for preparing a compound of the formula

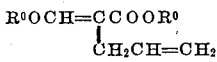

which comprises reacting by heating together at 50° to 150° C. in the presence of an acidic catalyst from the class consisting of sulfuric acid, phosphoric acid, and p-toluenesulfonic acid a compound of the formula

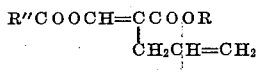

with an excess of a non-tertiary alcohol R⁰OH, separating from the reaction mixture an ester of the acid R″COOH, and forming said compound, R″ being an alkyl group of not over three carbon atoms, R⁰ being a non-tertiary hydrocarbon group of not over nine carbon atoms, and R being a non-tertiary alkyl group of not over eight carbon atoms, the alcohol R⁰OH boiling at least as high as the alcohol ROH.

2. A process for preparing a compound of the formula

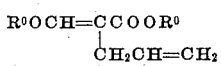

which comprises reacting by heating together between 50° and 150° C. in the presence of an acidic catalyst from the class consisting of sulfuric acid, phosphoric acid, and p-toluenesulfonic acid a compound of the formula

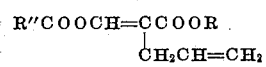

with an excess of non-tertiary aliphatic alcohol R⁰OH, separating from the reaction mixture an ester of the acid R″COOH, and forming said compound, R″ being an alkyl group of not over three carbon atoms, R⁰ being a non-tertiary aliphatic hydrocarbon group of not over four carbon atoms olefinically unsaturated in the 2,3-position, and R being a non-tertiary alkyl group of not over two carbon atoms.

3. The process of claim 2 wherein R⁰ is the group $CH_2=CHCH_2-$

4. A process for preparing a compound of the formula

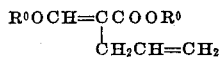

which comprises reacting by heating together between 50° C. and 150° C. in the presence of an acidic catalyst from the class consisting of sulfuric acid, phosphoric acid, and p-toluenesulfonic acid a compound of the formula

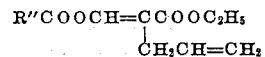

with an excess of a saturated monohydric aliphatic non-tertiary alcohol R⁰OH, separating from the reaction mixture an ester of the acid R″COOH, and forming said compound, R″ being an alkyl group of not over three carbon atoms and R⁰ being the hydrocarbon residue of said alcohol and containing not over eight carbon atoms.

5. The process of claim 4 in which R⁰ is 2-ethylhexyl.

6. The process of claim 4 in which R⁰ is ethyl.

7. A compound of the formula

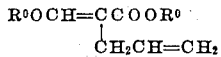

wherein R⁰ is a non-tertiary hydrocarbon group of not over nine carbon atoms.

8. A compound of the formula

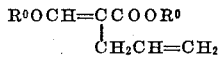

wherein R⁰ is a non-tertiary alkyl group of not over eight carbon atoms.

9. A compound of the formula

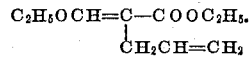

10. A compound of the formula

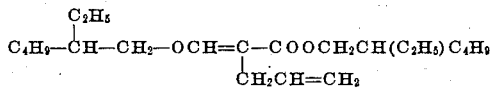

11. A compound of the formula

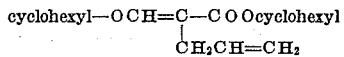

JOHN O. VAN HOOK.
WILLARD J. CROXALL.

REFERENCES CITED

The following references are of record in the file of this patent:

UNITED STATES PATENTS

| Number | Name | Date |
|---|---|---|
| 2,406,590 | D'Alelio | Aug. 27, 1946 |

FOREIGN PATENTS

| Number | Country | Date |
|---|---|---|
| 13,347 of 1905 | Great Britain | Aug. 31, 1905 |

OTHER REFERENCES

Meyer: Comptes Rendus, vol. 203, pp. 1074–1077 (1936).